(12) United States Patent
Bergman

(10) Patent No.: US 6,176,450 B1
(45) Date of Patent: *Jan. 23, 2001

(54) PROTECTIVE MAT

(75) Inventor: James Bergman, Cincinnati, OH (US)

(73) Assignee: I.L.Y.P. Sales, Inc., Cincinnati, OH (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/032,498

(22) Filed: Feb. 26, 1998

(51) Int. Cl.⁷ .................................................. B64D 47/00
(52) U.S. Cl. ........................... 244/1 R; 244/121; 150/166
(58) Field of Search ..................... 244/1 R, 121; 150/166

(56) References Cited

U.S. PATENT DOCUMENTS

| | | |
|---|---|---|
| D. 339,560 | 9/1993 | Byrd ..................................... D12/203 |
| 2,526,389 * | 10/1950 | Montefalco . |
| 2,807,564 | 9/1957 | Mitchell ................................. 154/49 |
| 3,044,516 * | 7/1962 | Stoll . |
| 3,720,181 | 3/1973 | Elkins ................................. 116/64 P |
| 4,598,883 * | 7/1986 | Suter . |
| 4,606,516 * | 8/1986 | Willison . |
| 5,067,667 * | 11/1991 | Shivers . |
| 5,240,759 | 8/1993 | Layton ................................. 428/131 |
| 5,443,870 | 8/1995 | Lurie et al. ............................ 428/17 |
| 5,611,501 * | 3/1997 | Crandley . |
| 5,845,873 * | 12/1998 | Millard . |

* cited by examiner

Primary Examiner—Peter M. Poon
Assistant Examiner—Tien Dinh
(74) Attorney, Agent, or Firm—Wood, Herron & Evans LLP

(57) ABSTRACT

A protective mat to indicate load bearing and non-load bearing flat surfaces on an aircraft. The mat is formed of a flexible non-slip material and has indicia that correspond to indicia upon aircraft flat surfaces, the indicia on the aircraft flat surfaces indicating the weight bearing capability of those surfaces. The mat is manufactured so that its configuration are aircraft make and model specific.

6 Claims, 2 Drawing Sheets

PROTECTIVE MAT

FIELD OF THE INVENTION

This invention relates to aircraft. More particularly, this invention relates to a protective mat for an aircraft.

BACKGROUND

Aircraft must be serviced from time to time, when they breakdown or for periodic maintenance. As aircraft are worked on, mechanics must pay attention not only to the service work they perform, but also to the parts and surfaces of the aircraft. If the mechanic is not careful to avoid certain areas on an aircraft, damage may result. Damage from a paint scratch to a structural failure could be caused by the mechanic. This is especially so when a mechanic performs regular periodic maintenance on an aircraft.

When aircraft mechanics attempt to provide a makeshift barrier between themselves and the aircraft to prevent accidental damage, they encounter a number of problems caused by using a barrier material that is not suited for the job of protecting an aircraft from the mechanic. Often, simple blankets are used as a barrier between a mechanic and an aircraft. These blankets are not effective for a number of reasons. The blanket size can be too big or too small relative to the surface to be protected. If too big, the blanket can act as an impediment to the mechanic's work, slowing him down and/or creating a safety hazard for the mechanic by snagging tools or becoming entangled in an aircraft's working parts. If a blanket is too small, then not enough protection is afforded the aircraft, and misplaced tools could foul operating surfaces and other critical operating parts.

One of the most serious and common problems associated with using simple blankets as barriers occurs when a blanket is thrown over aircraft surfaces that have various load bearing capabilities at different locations on those surfaces. Aircraft have a number of large flat surfaces upon which mechanics may stand in order to gain access to and work on the aircraft's engines, rudders and other systems vital to its proper and safe operation. Flat aircraft surfaces such as engine fairings, wings and tails generally have portions of their surfaces which may safely bear a mechanic's weight. More importantly, the above mentioned surfaces all have portions which may not safely bear a mechanic's weight. These areas are designated with a "no-step" or similar indication.

Furthermore, the various flat surfaces on a specific make and model of aircraft, e.g., an engine fairing or wing on a Cessna Citation, are differently shaped from the analogous flat surfaces on another make and model of aircraft, e.g., an engine fairing or wing on a Piper Cherokee. To compound the problem, the "no-step" areas on each surface vary according to the make and model of aircraft.

When simple blankets are used as a protective barrier between the mechanic and the aircraft, the "no-step" indication is obscured so that a mechanic has nothing to rely on other than memory to tell him which areas of the flat surface are safe to bear weight upon. One misstep by the mechanic using a simple blanket for protection may lead to a structural failure that may be expensive to fix and potentially dangerous to the aircraft's passengers if the failure goes unnoticed and not corrected.

SUMMARY OF THE INVENTION

It is an object of the present invention to provide a protective mat for aircraft surfaces, the mat being placed upon these surfaces to indicate which portions of the surface may safely bear weight without damaging the aircraft.

It is another objective of the present invention to provide a protective mat with indicia specific to the make and model of an aircraft, and that aircraft's flat surface the mat is used to protect.

These and other objectives of the invention are achieved by providing, in preferred form, a protective mat made from a resilient non-slip material. The material is cut to a configuration that conforms to a specific flat surface for a make and model of an aircraft. Each mat is also marked to indicate step/no-step areas for that aircraft.

Each mat cut to conform to a specific type of aircraft and that aircraft's specific flat surface is marked with "no-step" area indicia so that when a mat is correctly positioned over the aircraft's flat surface the indicia identify the portion or portions of that flat surface which may not safely bear weight. Because each mat is not only surface specific, but also aircraft make and model specific, the mat is shaped to make it easier to correctly position the mat on each surface to be protected with the "no-step" area indicia on the mat overlaying the "no-step" area indicia on the aircraft's flat surfaces with which it is used.

The objectives and advantages of the present invention will be further appreciated in light of the following detailed description.

DETAILED DESCRIPTION OF THE PREFERRED METHOD

Figure 1:
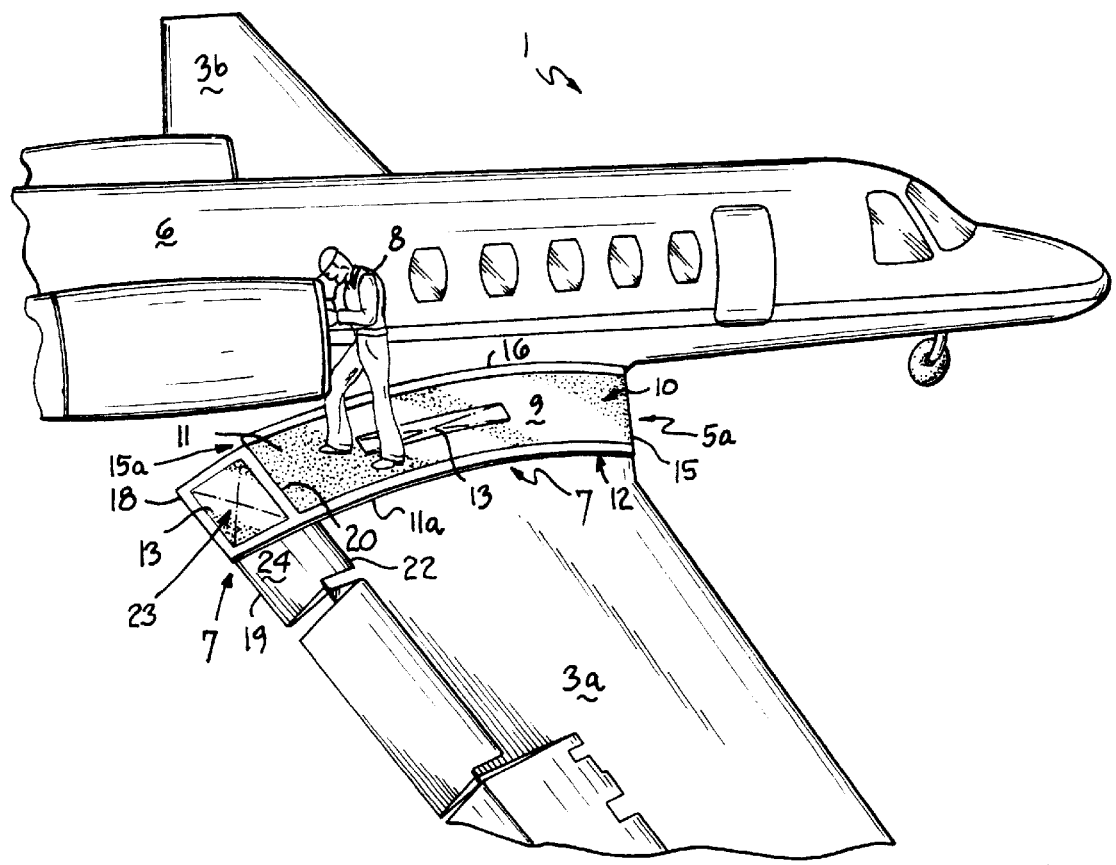
FIG. 1 is a perspective view of an aircraft fuselage and main wings with protective mat.
Figure 2:
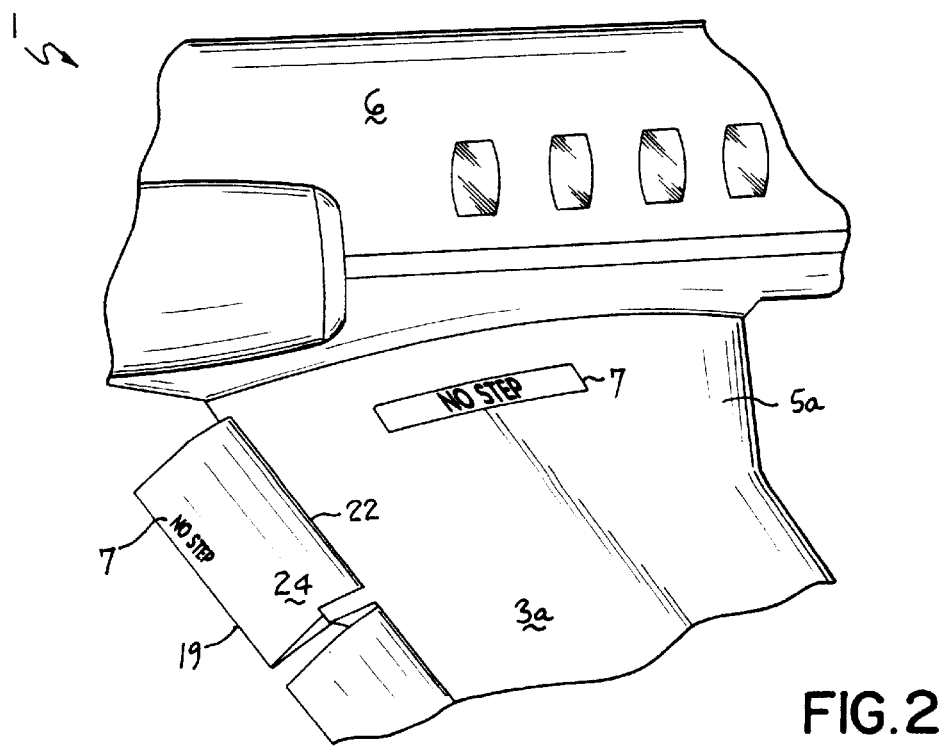
FIG. 2 is a perspective view of an aircraft fuselage and main wing without a protective mat.
Figure 4:
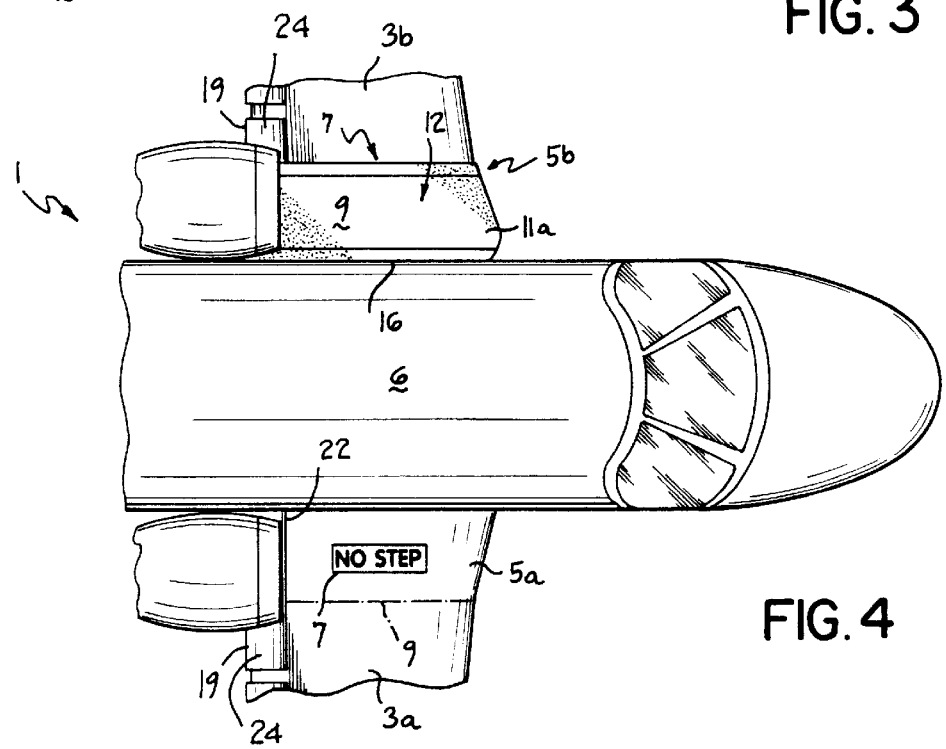
FIG. 4 is a top view of an aircraft fuselage and main wings with a protective mat.
Figure 5:
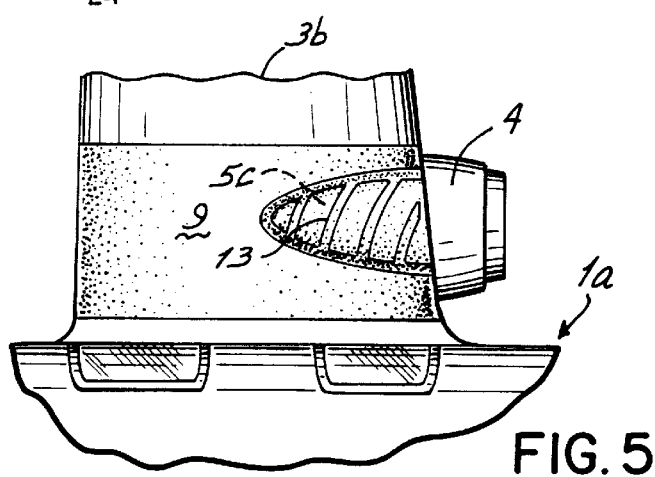
FIG. 5 is a top view of an engine fairing with a protective mat.

Referring first to FIGS. 1 and 4, an aircraft 1 has main wings 3a, 3b which are oppositely disposed on either side of a fuselage 6. The main wings 3a, 3b have first and second flat surfaces 5a, 5b respectively on which a user 8 will stand when servicing the aircraft 1. The main wing 3a has "no-step" areas 7 designated upon the flat surface 5a which may or may not be the same as the "no-step" areas 7 upon the second flat surface 5b of main wing 3b. The "no-step" areas 7 mark the portions of the flat surface 5a upon which weight should not be carried. As seen in FIG. 5, Certain aircraft 1a have other surfaces 5c, such as engine fairings 4 and tails with similar first and second flat surfaces with respective "no-step" areas 7. The indicia for the "no-step" areas 7 may vary depending on the make and model of aircraft.

Figure 3:
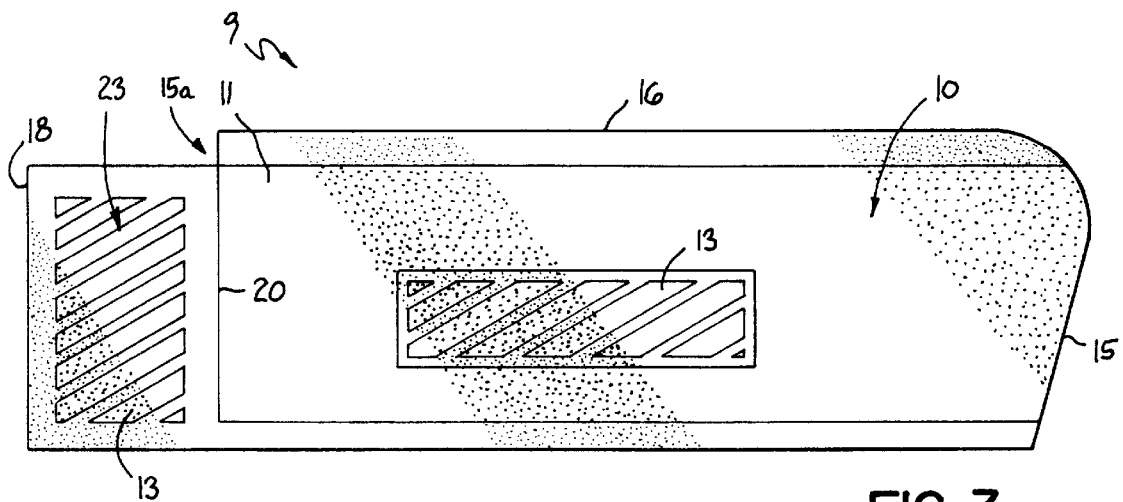
FIG. 3 is a top view of a protective mat.

As can be seen in FIG. 1, a protective mat 9 is placed over the first flat surface 5a when maintenance of the aircraft is needed. The protective mat 9 has an obverse side 10 and a reverse side 12, both with a non-slip surfaces 11, 11a (FIG. 3) which prevents the mat 9 from sliding off the wing 3a and the user 8 from slipping off the mat 9. In the preferred embodiment, the obverse side 10 has a pebble or ribbed non-slip surface 11 and the reverse side 12 has a smooth non-slip surface 11a for maximum adhesion to a flat surface. Each mat 9 is formed to have a configuration 15a corresponding to or mating with a specific flat surface, each flat surface shape varying according to the make and model of aircraft.

The mat 9 has indicia 13 which corresponds to an area or areas of the flat surface 5a upon which a person 8 should not walk. When the mat 9 is correctly positioned upon the aircraft's flat surface 5a, the indicia 13 overlays the "no-step" areas 7 on the flat surface 5a so as to correctly mark areas which should not bear weight. The indicia 13 are modified depending upon which flat surfaces 5a, 5b and which make and model of aircraft 1, the mat 9 is intended to protect.

The mat 9 is preferably made from a fuel resistant non-marring rubber material. Such material can be purchased from the Ludlow Composites Corp. of Fremont, Ohio. The "no-step" areas 7 are marked with fuel resistant enamel paint or tape. The mat itself is simply cut to size so that it mates with the surface 5a it is intended to cover. If the cover is for a wing 3a, 3b it would be marked with "no-step" indicia 13 as needed for the wing surface itself as well as "no-step" indicia 13 for the flap.

Thus, the mat 9 can simply be placed over the aircraft wing 3a, 3b. Since the mat configuration 15, 15a corresponds to the wing 3a, 3b of the plane 1 being worked on, it is very easy to align the mat 9 correctly. The inside edge 16 of the mat 9 is simply set against the fuselage 6. The rear edge 18 of the mat 9 is set along the rear edge 19 of the flat surface 5a, 5b being covered. If it is a wing 3a, 3b, a user may align the line 20 designating the forward edge of the flap area 23 with the forward edge 22 of the flap 24. Aligning two edges or lines of the mat 9 with airplane structures such as the fuselage 6 or flap 24 will guarantee that the "no-step" indicia 13 are aligned with "no-step" areas 7 of the wing 3a, 3b or other aircraft flat surface.

Additional advantages and modifications will readily appear to those skilled in the art. The invention in its broader aspects is therefore not limited to the specific detail, representative apparatus and illustrative example shown and described. This has been a description of the present invention as currently known. However, the invention itself should only be defined by the appended claims, wherein we claim,

What is claimed is:

1. A protective mat adapted for use on a first aircraft surface of a specific make of an aircraft having specific no step areas on said surface, said mat indicating the load bearing capability of said first surface, said mat comprising:

a sheet having obverse and reverse sides, said reverse side being locatable against said first surface; and at least one marking upon said obverse side of said sheet wherein said marking indicates where a load should not be borne upon said first surface said marking overlapping said no step area of said aircraft when said sheet is located against said first surface, said sheet having a configuration which mates with said first surface.

2. The protective mat of claim 1, said sheet having a configuration analogous and specific to said first surface.

3. The protective mat of claim 1, said first surface being an engine faring surface.

4. The protective mat of claim 1, said first surface being a wing surface.

5. The protective mat of claim 1, wherein said protective mat is a flexible material.

6. The protective mat of claim 1, wherein said reverse side has a non-slip frictional surface that allows said mat to remain frictionally engaged with said first surface.

* * * * *